Dec. 7, 1926.
E. KNICKERBOCKER
1,609,516
FENDER
Filed March 31, 1926
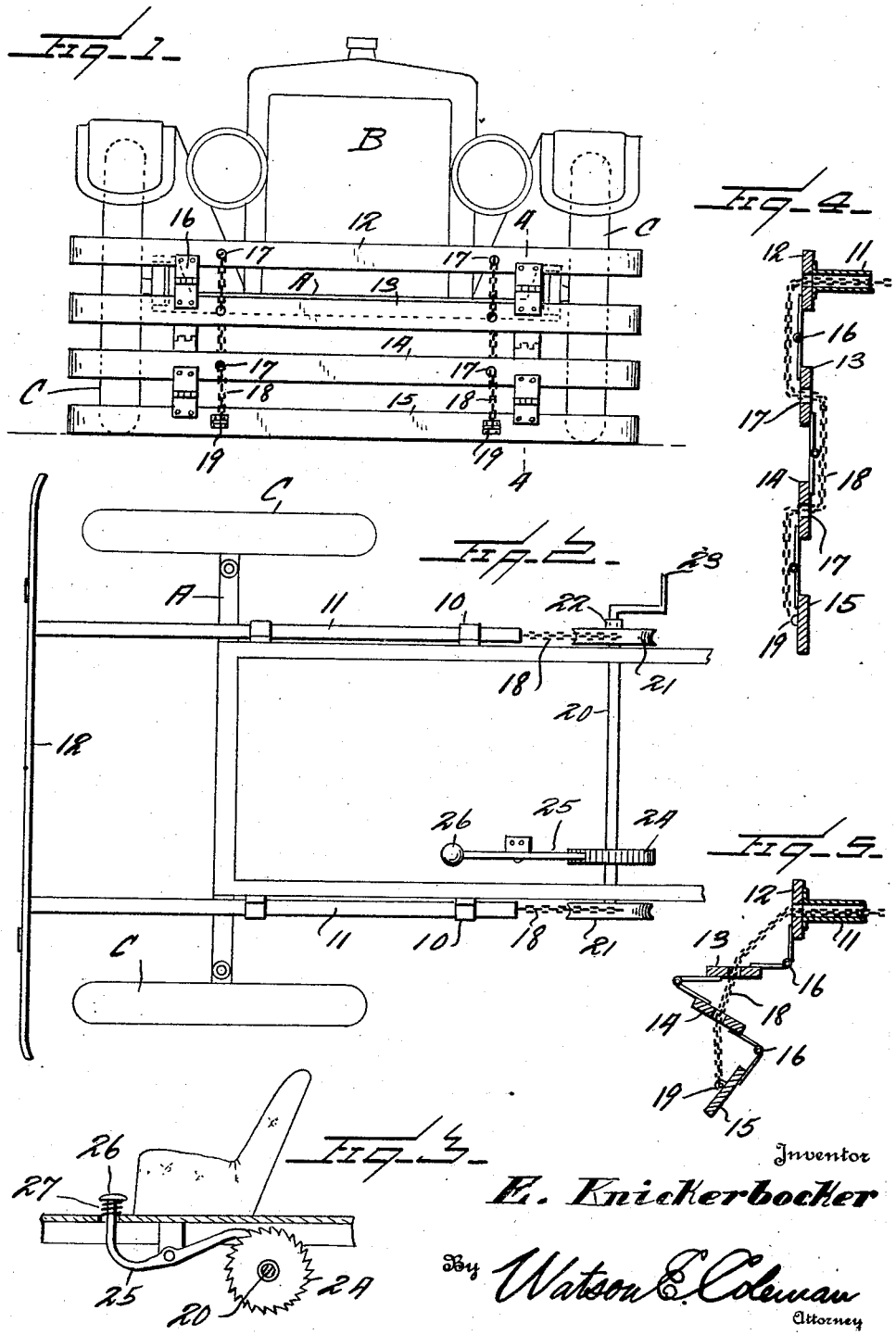
Inventor
E. Knickerbocker
By Watson E. Coleman
Attorney Patented Dec. 7, 1926.

1,609,516

UNITED STATES PATENT OFFICE.

EVALYN KNICKERBOCKER, OF MATAWAN, NEW JERSEY.

FENDER.

Application filed March 31, 1926. Serial No. 98,928.

This invention relates to fenders for automobiles and the general object of the invention is to provide a fender which, under normal circumstances, consists in effect of a single bar extending across the automobile in front of the radiator and preferably in front of the steering wheels, which fender consists of a plurality of bars flexibly and preferably hingedly connected to each other so that the bars may be folded up against the top bar of the fender under normal circumstances but dropped to provide a series of transversely extending guard bars or fender bars extending downward to the roadway when the bars are released.

A further object is to provide means under the control of the motorist for releasing said bars instantaneously whenever it is necessary and provide means for holding said bars raised to form the ordinary fender under ordinary circumstances.

A still further object is to provide a fender which will not only when in use act as a guard to prevent injury to persons who may be knocked down by the automobile, but which will also act to some extent as a brake.

Other objects will appear in the course of the following description.

My invention is illustrated in the accompanying drawings wherein:—

Figure 1 is a front view of an automobile equipped with my improved fender, the fender being lowered;

Fig. 2 is a plan view of the structure shown in Figure 1;

Fig. 3 is a fragmentary sectional view showing the means for holding the fender raised;

Fig. 4 is a vertical sectional view showing the fender lowered;

Fig. 5 is a like view to Figure 4 but showing the fender partially raised.

Referring to the drawings it will be seen that I have illustrated a conventional and ordinary automobile having the usual front axle A, a radiator B, and the wheels C. Extending longitudinally of the automobile, as illustrated in Figure 3, and attached to the frame thereof in any suitable manner, as by bands 10, are the tubes 11 which may be made of any suitable material and which extend to a position in front of the radiator. The tubes carry the transversely extending uppermost bar 12 which is thus permanently supported upon the automobile at the normal height of the fender. This transverse bar might be supported in any other desired way but preferably the guide tubes will extend rearward from this bar and open upon the face thereof.

Coacting with the bars 12 are a plurality of fender bars 13, 14 and 15. These are flexibly connected to each other as by hinges 16 and apertured as at 17 for the passage of the chains 18. Each of these chains 18 is attached to the last bar of the series 15 as by attaching the chain to a plate 19, riveted or otherwise attached to the bar 15. Each chain passes upward from the bar 15, then through the hole 17 in the bar 14, then upward on the inside of the bar 13 through the hole 17 thereof, and through the opening in the bar 12 and along the pipe 11. Thus, when these chains are drawn taut, the bars will be drawn upward against the upper bar 12 and the fender will consist of four thicknesses of bars 12, 13, 14 and 15 in overlying relations. These bars are preferably connected to each other by hinges 16 disposed in reverse order to each other so that as the chains 18 are tightened, the lower bar 15 will rise upward against the front face of the bar 14, the bar 14 will then rise upward against the front face of the bar 13, and the three bars will then be raised up against the front face of the bar 12. I do not wish to be limited to any particular means for holding the chains 18 taut with the bars in their overlapped and raised position but I have illustrated for this purpose and preferably use a shaft 20 which is mounted in suitable bearings in the frame of the machine and carries upon it the wheels 21, these wheels being preferably grooved and may be toothed to engage the chains 18. The shaft 20 at one end may be formed with a socket 22 for engagement by a removable crank 23 so that the shaft 20 may be turned to wind up the chains on the drums or pulleys 21. The shaft 20 carries upon it a toothed or ratchet wheel 24 and coacting therewith is a pawl 25 normally engaging the teeth on the wheel 24 and preventing the shaft from unwinding. The pawl is released by means of a pedal 26 preferably disposed on the floor of the car immediately in advance of the driver's seat. The pawl is urged against the toothed wheel by the spring 27. Any suitable pawl operating mechanism may be used.

The manner in which this fender operates will be obvious from what has gone before. Under normal circumstances the fender bars will be folded one upon the other and present the appearance of the usual fender and will, of course, act as the usual fender. The upper fender bar might be supported by springs so as to also act as a bumper. In case there is danger of running down a person or animal, the driver immediately releases the pawl and the fender bars fall downward and take the position shown in Figure 1 and completely prevent anybody from getting under the wheels or beneath the machine. The lowermost bar will preferably just touch the road surface so that it will swing backward beneath the wheels of the automobile and there will be no chance of any obstruction acting to crowd the fender upward. It will be seen that the fender bars have a length greater than the distance between the front wheels of the machine and are disposed in advance of these front wheels so that when the fender is dropped and if the fender should strike an obstruction, the fender will swing rearward until the fender lodges against the wheels. This rearward movement would occur very shortly after the fender had struck the impediment but this rearward movement will be sufficient to relieve the impact which would be present if a relatively immovable fender struck an object such as a person. The fact that the fender is sufficiently long to touch the road and the fact that it will swing rearward against the wheels will cause it to act somewhat as a brake, as before stated.

While I have illustrated certain details of construction and arrangement of parts which I prefer and regard as being particularly effective, I do not wish to be limited thereto as many changes might be made therein without departing from the spirit of the invention as defined in the appended claims.

I claim:—

1. The combination with an automobile, of a fender composed of a plurality of sections flexibly connected to each other for folding movement upon each other and for rearward swinging movement when the sections are unfolded, the uppermost section being mounted upon the automobile, and flexible means for drawing the sections up into overlapping engagement with each other against the permanently mounted section or for releasing said sections to permit them to fall to a depending position.

2. The combination with an automobile, of a fender section permanently mounted upon the forward end thereof in advance of the front wheels of the automobile, a plurality of fender sections disposed in successive order, each of last named fender sections having a length greater than the distance between said front wheels, flexible connections connected to the several fender sections and when drawn taut acting to hold the fender sections raised against the permanent fender section, and means for holding the flexible connections taut, and the fender sections lifted, said means being releasable to permit the fender sections to drop, the fender sections being flexibly connected to each other to permit them to swing rearward toward the front wheels of the automobile when the sections are released and dropped.

3. The combination with an automobile, of a fender section permanently mounted thereon, a plurality of fender sections flexibly connected to each other and flexibly connected to the first named fender section, flexible connections passing through the several sections and when taut drawing said sections upward, and means for holding the flexible connections taut, said means being releasable by the driver of the automobile to permit the sections to fall.

4. The combination with an automobile, of a fender section fixedly mounted upon the automobile, a series of fender sections hingedly connected to each other and to the fixed fender section, a plurality of flexible connections passing loosely through all of the fender sections except the lower section and attached to said lower section and acting when taut to draw the fender sections upward and into overlapping relation, and means for holding the flexible connections taut, said means being releasable by the driver to permit the fender sections to fall.

5. The combination with an automobile, of a fender section fixedly mounted upon the automobile and extending transversely thereof beyond the steering wheels, a plurality of flexibly connected fender sections, the uppermost section of which is flexibly connected to the fixed fender section, flexible connections attached to the lowermost fender section and passing loosely through the other fender sections and extending rearward on each side of the automobile and when taut acting to hold the fender sections in superposed relation, a winding shaft upon which the flexible connections are wound, means for rotating said shaft to wind up the flexible connections, a ratchet wheel on the shaft, and a manually releasable pawl engaging the ratchet wheel.

6. The combination with an automobile, of tubes disposed on each side thereof and extending to the front thereof, a fender section fixed to said tubes and through which the tubes open, flexible connections passing through said tubes a lowermost fender section to which the flexible connections are attached, fender sections intermediate the lowermost section and the fixed fender section having openings through which the flexible connections loosely pass, hinge members connecting the sections to each other, a winding shaft upon which the flexible connections are wound, and manually releasable means for holding the winding shaft from unwinding.

EVALYN KNICKERBOCKER.